United States Patent
Luhmann

(12) 
(10) Patent No.: US 6,195,725 B1
(45) Date of Patent: Feb. 27, 2001

(54) DYNAMICALLY VARYING INTERRUPT BUNDLE SIZE

(75) Inventor: Patrick J. Luhmann, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/211,073

(22) Filed: Dec. 14, 1998

(51) Int. Cl.$^7$ .................................................. G06F 9/46
(52) U.S. Cl. ........................................ 710/266; 710/262
(58) Field of Search ................................. 710/261, 262, 710/263, 265, 266, 48, 49, 35; 709/250

(56) References Cited

U.S. PATENT DOCUMENTS

| 5,613,129 | 3/1997 | Walsh . | |
|---|---|---|---|
| 5,708,814 | 1/1998 | Short et al. . | |
| 6,085,277 | * 7/2000 | Nordstrom et al. | 710/263 |
| 6,115,779 | * 9/2000 | Haubursin et al. | 710/262 |

FOREIGN PATENT DOCUMENTS

| 0 852 357 A2 | 7/1998 | (EP) . |
| 0 871 307 A2 | 10/1998 | (EP) . |
| WO 95/03584 | 2/1995 | (WO) . |

* cited by examiner

Primary Examiner—Glenn A. Auve
(74) Attorney, Agent, or Firm—Trop, Pruner & Hu, P.C.

(57) ABSTRACT

A system generates interrupts in response to events and dynamically accommodates for changing rates of event generation. A number of events may be bundled together to generate one or more interrupts instead of generating an interrupt for each event. For example, in connection with network controllers, each time a frame is received, it may be stored and bundled with a predetermined number of other frame receipt events to decrease the number of interrupts which must be handled. If a timer times out before all of the predetermined events have occurred, the ensuing bundle size may be decreased. Conversely, if all of the events occur before the timer times out, the ensuing bundle may be increased in size. In this way, the system dynamically accommodates for increased or decreased event activity, optimizing the number of interrupts that may be necessary.

19 Claims, 4 Drawing Sheets

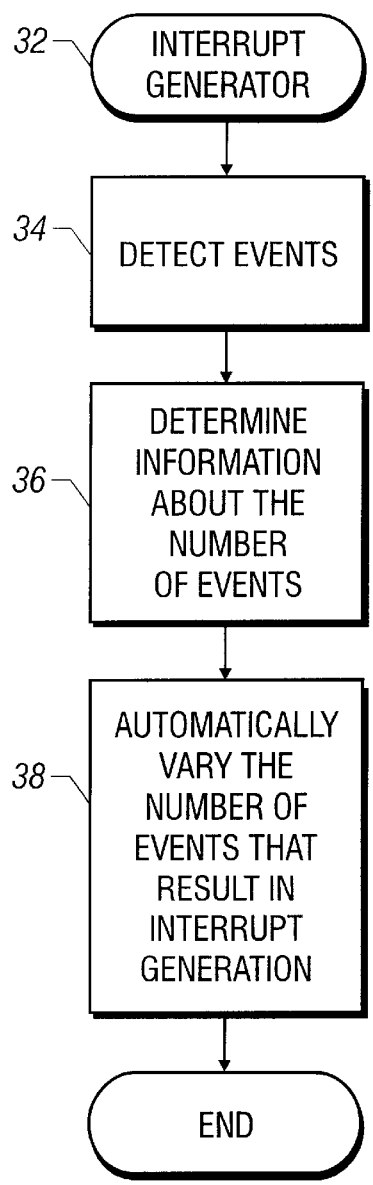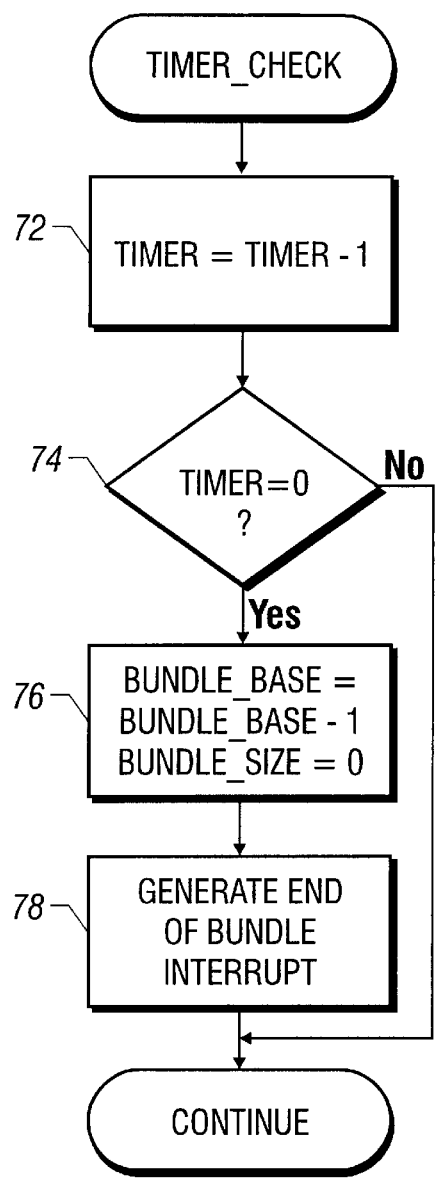
FIG. 3                    FIG. 5

DYNAMICALLY VARYING INTERRUPT BUNDLE SIZE

BACKGROUND

This invention relates generally to generating interrupts in devices controlled by processors, such as computer systems.

Computer systems use interrupts to redirect the focus of a processor or other controller from a first task to a second task. Normally interrupts arise when peripheral devices receive information and need to have that information handled through the processor or controller. Thus, for example, when a new frame is received by a network interface card (NIC) from the network, an interrupt may be generated.

Each time an interrupt is generated, the processor is interrupted, decreasing its efficiency of operation. Thus, interrupt events may be bundled together to produce a single interrupt for a plurality of such events. This may decrease the number of interrupts, increasing the performance of the peripheral device.

Generally the performance of a peripheral device may be determined by its P/E ratio which is the ratio of performance or bandwidth divided by efficiency or processor utilization. More interrupts increase processor utilization, decreasing the efficiency of the peripheral device.

Generally, peripheral devices include interrupt controllers that generate interrupts. However, in some cases, the interrupt controller may be located outside the peripheral device. In many cases, by decreasing the number of times that a processor is interrupted, the efficiency of the peripheral device may be improved.

Thus, there is a continuing need to improve the performance of peripheral devices.

SUMMARY

In accordance with one embodiment, a method of generating interrupts includes detecting a plurality of events which trigger interrupts. Information about the number of the events may be determined. Based on the information, the number of events that result in one or more interrupts being generated may be varied automatically.

BRIEF DESCRIPTION OF THE DRAWING

FIG. 3 is a flow diagram for the state machine shown in FIG. 2;

FIG. 5 is a continuation of the flow diagram shown in FIG. 4;

DETAILED DESCRIPTION

Figure 1:
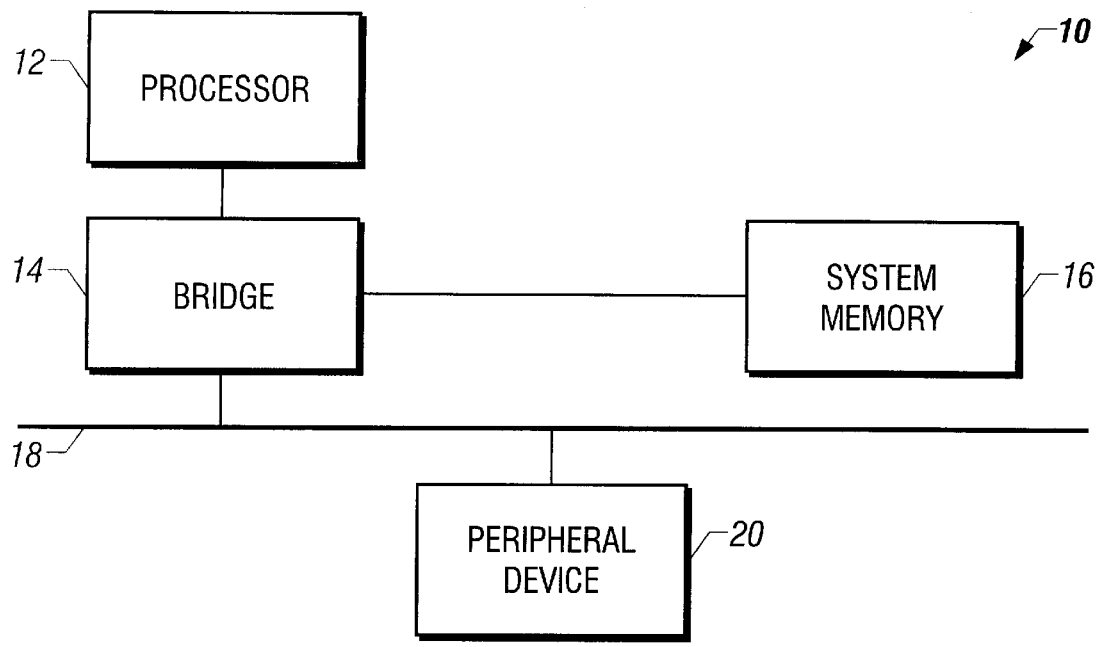
FIG. 1 is a block diagram of a processor-controlled system in accordance with one embodiment of the invention.

Referring to FIG. 1, a processor-controlled system 10 may include a processor 12 coupled to a bridge 14. The bridge 14 may be coupled to system memory 16 and a bus 18. A peripheral card or device 20 may then be coupled to the bus 18. In conventional fashion, the peripheral device 20 may generate interrupts which may be serviced by the system 10 using an interrupt service routine (ISR). The peripheral device may be a network interface card (NIC) or any of a variety of other input/output devices which handle inputs or outputs to or from the system 10, including, for example, a disk controller.

Figure 2:
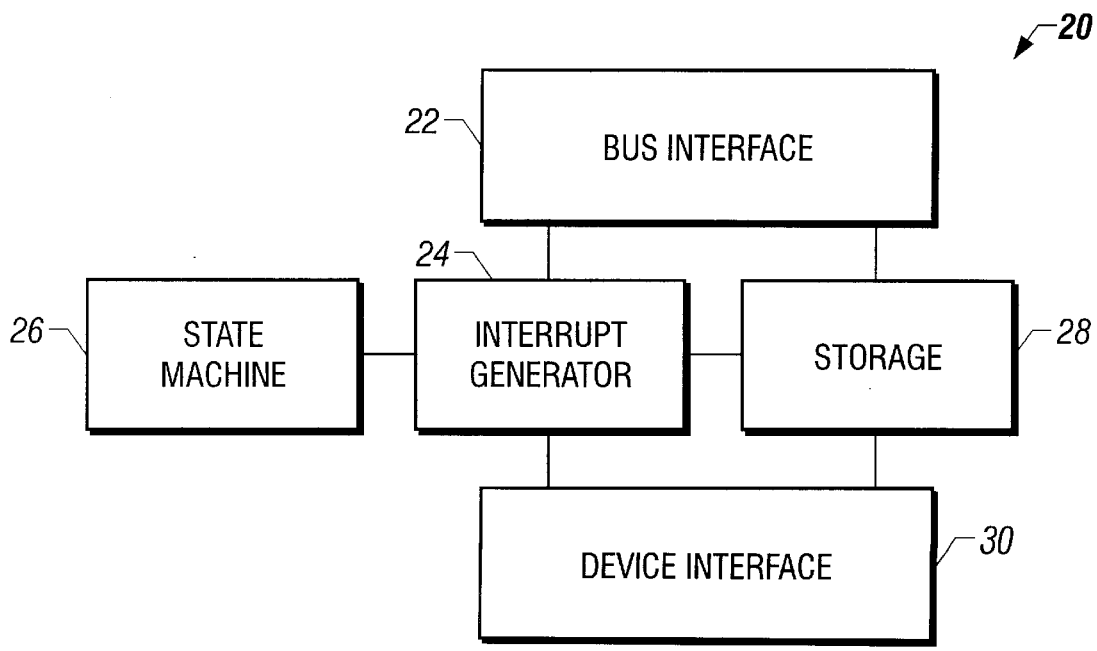
FIG. 2 is a block diagram of the peripheral device shown in FIG. 1.

Referring next to FIG. 2, the peripheral device 20, in one embodiment of the invention, may include an interface 22 which interfaces the device 20 with the bus 18. The device 20 may also include an interface 30 which interfaces the device with another device or system such as a network in the case of a network interface card. An interrupt generator 24 may communicate with the device interface 30 to receive events and may communicate with the bus interface 22 to transmit the interrupts to the bus 18. The interrupt generator may be controlled by a state machine 26, in the embodiment of the invention illustrated in FIG. 2. In addition, storage unit 28, which may be conventional computer memory, may be provided to store information related to the operation of the peripheral device 20.

While the peripheral device 20 is illustrated as using a state machine 26 to control the interrupt generator 24, a variety of other techniques may be used as well. For example, the interrupt generator may be implemented in hardware. The interrupt generator may also be controlled by application software. However, it is advantageous in some instances to use the state machine 26 to control the interrupt generator 24, with state machine protocols stored in microcode.

Referring to FIG. 3, one example of a flow for the state machine 26 is illustrated. The same flow may be used to implement other software-based implementations. Similarly the flow may be adapted to a hardware-based implementation by incorporating the illustrated features in hardware devices.

Initially the flow detects events which normally call for the generation of an interrupt, as indicated in block 34. In one embodiment of the invention, a number of events may be bundled and one or more interrupts may be generated for the bundle of events as a whole. For example, in one embodiment of the invention, an event may be generated at the beginning of the bundle and at the end of the bundle.

Referring to block 36, the flow determines information about the number of events. In periods when the number of events is high, it may be desirable to increase the bundle size. In periods when the number of events is low, it may be desirable to reduce the bundle size. Changing the bundle size may improve the efficiency of the device 20.

Referring to block 38, based on the information about the number of events, the software automatically varies the number of events that result in interrupt generation. In one embodiment of the invention, the events per interrupt may be adjusted by changing the number of events per bundle.

Figure 4:
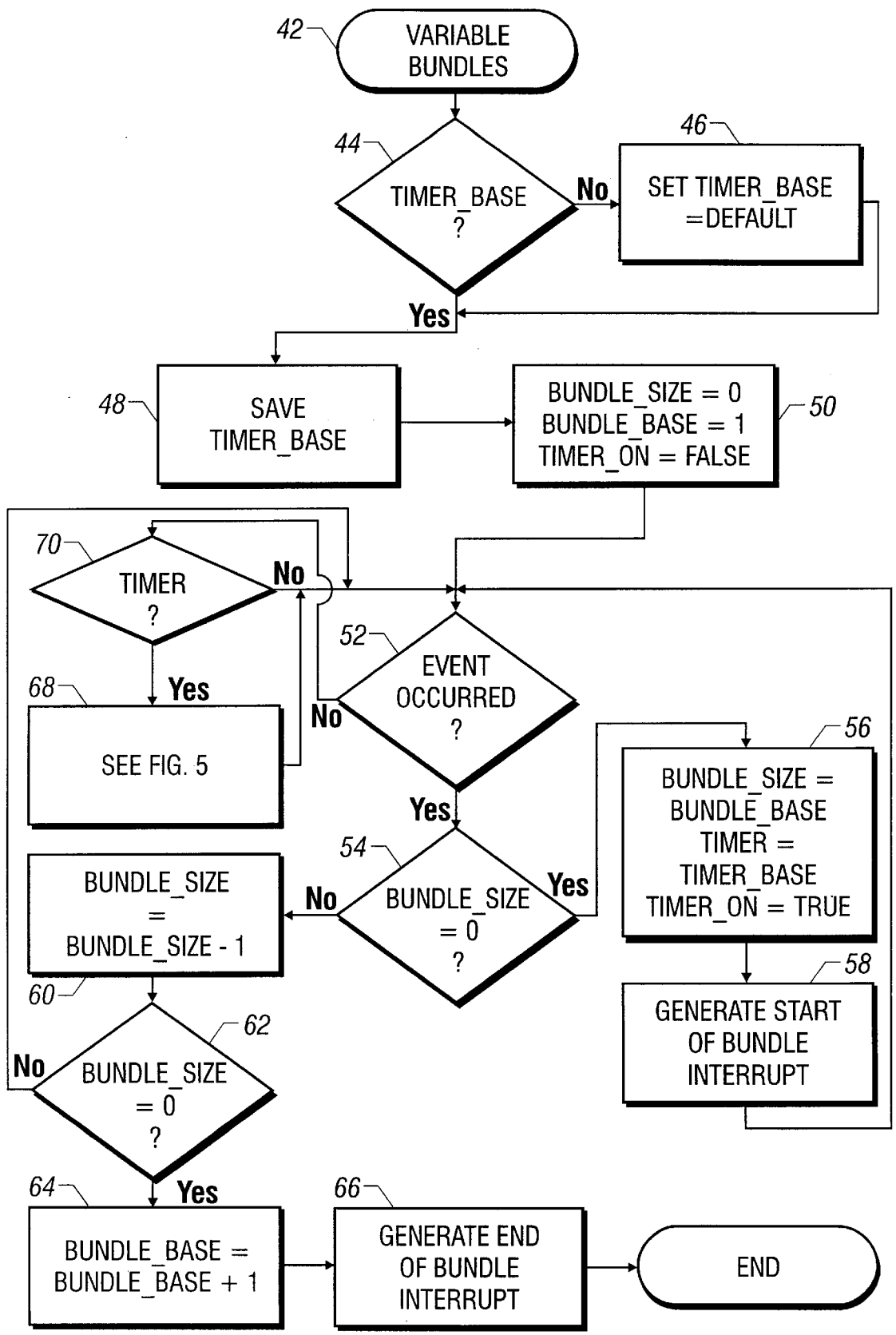
FIG. 4 is a more detailed state flow diagram for the state machine shown in FIG. 2.

A more detailed embodiment, shown in FIG. 4, uses the flow 42. Initially a check determines whether a variable, called timer_base, in one illustrated embodiment, has been specified by the user, as indicated in diamond 44. The variable names used herein are for ease of description and are not intended to be limiting in any way. The user may indicate a desired time period for filling a bundle based on the user's understanding of how many events may be generated. If the user fails to input the timer_base variable, the timer_base variable may be set to a default value. As indicated in block 48, the timer_base variable is saved.

Next, in one embodiment of the invention, a variable called bundle_size is set to zero, a variable called bundle_base is set to 1 and a variable called timer_on is set to false, as indicated in block 50. Bundle_size is a variable which specifies the number of events remaining to be detected in a bundle. Bundle_base is a variable that specifies the number of events that currently make up one full bundle. In other words, when the number of events specified by the bundle_base have been received, the interrupt or interrupts are generated. Setting the variable timer_on equal to false indicates that the timer is not yet activated. The timer may be implemented in software or hardware or a combination thereof.

A check at diamond 52 determines whether an event has been detected that precipitates an interrupt. For example, in a network application, when a frame is received, an event is thereby generated and normally, that event calls for the generation of an interrupt.

If an event has occurred, a check determines whether the variable bundle_size is equal to zero, as indicated at diamond 54. If so, that indicates that the event is the first event of a given bundle.

In the first event situation, the variable bundle_size may be set equal to the variable bundle_base, the variable timer is set equal to the value of the variable timer_base and the variable timer_on is set equal to true, starting the timer, as indicated in block 56. In one embodiment of the invention, a start of bundle interrupt may then be generated.

If the event is not the first event of the current bundle, then the variable bundle_size is set equal to the value of the variable bundle_size minus one, as indicated in block 60. This indicates that the available bundle space has now been decremented. Next, in diamond 62, a check determines whether the bundle_size variable is now equal to zero. If so, this indicates that the bundle has been filled with the pre-determined number of events. Since the bundle is full, the bundle_base variable is increased to bundle_base+1 (block 64). Thus, the next bundle is enlarged to accommodate one more event.

Next, as indicated in block 66, an end of bundle interrupt may be generated in one embodiment of the invention. The flow thereafter ends or effectively returns to wait for the next event.

If the bundle_size variable is not yet equal to zero, indicating that the bundle is not yet filled, the flow returns to diamond 52. If no event is detected at diamond 52 a check at diamond 70 determines whether timer may be decremented. If not, the flow recycles back to await the next event at diamond 52. If it is time to decrement timer, the flow continues (block 68) in FIG. 5. Referring to FIG. 5, the timer variable is decremented as indicated in block 72. If the timer variable has been decremented to zero, pursuant to a check undertaken at diamond 74, the variable bundle_base is set equal to bundle_base minus 1 and bundle_size is set equal to zero. In that case, since the timer timed out before the bundle was filled with events, the bundle size for the next bundle is decreased, and the variable bundle size is initialized, as indicated at block 76. The flow may then recycle to await the first event of the next bundle, after generating the end of bundle interrupt, as indicated in block 78. Thus, the flow continues back to the diamond 52 in FIG. 4.

Figure 6:
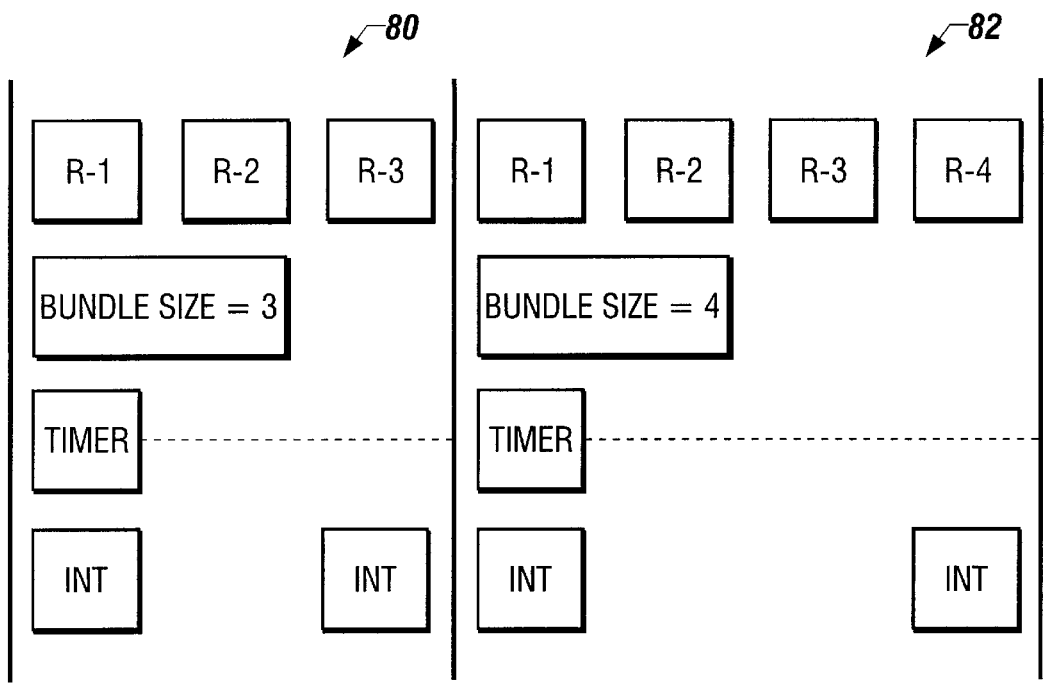
FIG. 6 is a conceptual depiction showing how events may be bundled for generating interrupts.

Referring to the example illustrated in FIG. 6, a pair of successive bundles 80 and 82 are illustrated. The bundle 80 is composed of three events, R1, R2 and R3. The vertical straight lines to either side of the events indicate the timer interval. Thus, as indicated at bundle 80, the variable bundle_size is initially equal to three. An interrupt was generated as indicated by the block INT at the beginning and end of the bundle. Because the timer did not expire before the bundle was filled, the next bundle 82 is increased in size by one, i.e., the variable bundle_base is increased by one.

Figure 7:
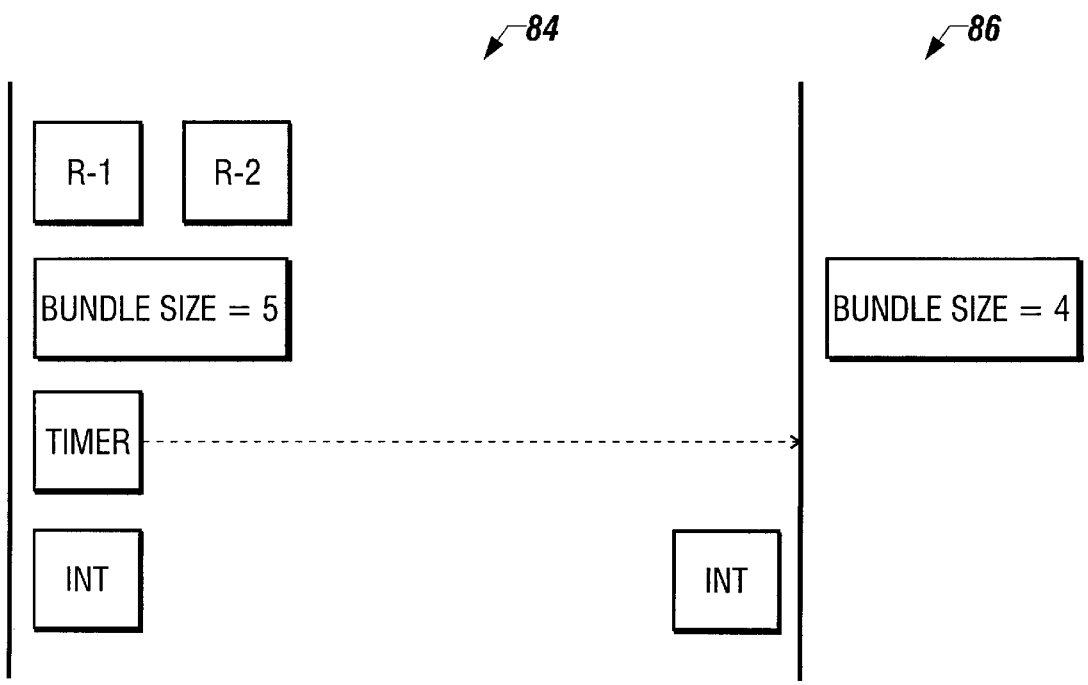
FIG. 7 is a conceptual depiction of another embodiment of the invention for bundling events for generating interrupts.

Referring to FIG. 7, the initial variable bundle_base of a bundle 84 was five but only two events, R1 and R2 were received before the timer timed out. Thus, although the variable bundle_base was five, the variable timer timed out before five events occurred. When the timer timed out, the second interrupt was generated. However, the next bundle 86 has its bundle_base variable reduced by one, to four.

While an interrupt may be generated proximate to the first and last events of a bundle in one embodiment of the invention, in other embodiments only a single interrupt may be generated per bundle, for example, proximate to the last event of the bundle. Generating an event at the beginning of the bundle may have advantageous in certain embodiments. For example, the processor may begin processing data related to the event in system memory, upon receipt of the first interrupt, before the bundle is filled and this may reduce latency. For example, in connection with a network interface card, the frames may be automatically stored in memory as they are received. Thus, the processor, notified by the initial interrupt, may access the frames and may begin processing the frames before all of the frames of bundle have been received.

In some embodiments of the invention, the number of events per bundle may be modified in the next succeeding bundle. In other embodiments, the variation of events may occur later, in an ensuing bundle after the next succeeding bundle. Alternatively, the number of events may only be modified if, for example, the bundle is repeatedly filled or not filled within a given time period.

Also, in some embodiments, the number of events per bundle may be re-evaluated in connection with each bundle. In other embodiments, the re-evaluation may occur at other intervals, either periodic or otherwise. As still another alternative, a detected event or characteristic may trigger re-evaluation of the number of events per bundle.

While the present invention has been described with respect to a limited number of embodiments, those skilled in the art will appreciate numerous modifications and variations therefrom. It is intended that the appended claims cover all such modifications and variations as fall within the true spirit and scope of the present invention.

What is claimed is:

1. A method of generating interrupts comprising:
   detecting a plurality of events that trigger interrupts;
   determining information about the number of said events; and
   based on said information, automatically varying the number of events which result in one or more interrupts being generated.

2. The method of claim 1 further including setting a number of events that make up a bundle, and triggering a first interrupt for the first event of the bundle and a second interrupt for the last event of the bundle.

3. The method of claim 1 wherein detecting a plurality of events includes detecting the receipt of frames.

4. The method of claim 1 further including setting a number of events that make up a bundle, and changing the number of events that make a bundle based on the number of events that occur in a pre-determined time period.

5. The method of claim 1 wherein determining information includes determining the number of events that occur within a pre-determined time period.

6. The method of claim 5 including setting a number of events that make up a bundle, and wherein the varying includes decreasing the number of events that make a bundle if the number of events that occur within the pre-determined time period is less than the number of events making up a bundle.

7. The method of claim 1 further including defining a number of events which make up a bundle, determining if after a predetermined time, the number of events have occurred, and if not, decrementing the number of events which make up a bundle.

8. An article comprising a medium, readable by a processor-based system, storing instructions that cause a processor-based system to:

detect a plurality of events that trigger interrupts;

determine information about the number of said events; and based on said information, automatically vary the number of events which result in one or more interrupts being generated.

9. The article of claim 8 including instructions that cause a processor-based system to set a number of events that make up a bundle, and trigger a first interrupt for the first event of the bundle and a second interrupt for the last event of the bundle.

10. The article of claim 9 including instructions that cause a processor-based system to change the number of events that make a bundle based on the number of events that occur in a pre-determined time period.

11. The article of claim 9 including instructions that cause a processor-based system to determine the number of events that occur within a pre-determined time period.

12. The article of claim 11 including instructions that cause a processor-based system to, if the number of events that occur within the pre-determined time period is less than the number of events making up a bundle, decrease the number of events that occur in a given time period in the ensuing bundle.

13. The article of claim 8 including instructions that cause a processor-based system to detect the receipt of frames.

14. The article of claim 8 including instructions that cause a processor-based system to define a number of events which make up a bundle, determine whether the number of events that make up a bundle have occurred within a pre-determined time period, and if not, decrement the number of events which make up a bundle.

15. An interrupt controller comprising:

an interrupt generator that generates interrupts in response to events; and a controller that selectively increases or decreases the number of events that give rise to the generation of one or more interrupts.

16. The interrupt controller of claim 15 further including a timer and a detector that detects whether a given number of events occur within a pre-determined time period.

17. The interrupt controller of claim 16 wherein said detector detects receipt of frames.

18. The interrupt controller of claim 15 wherein said controller changes the number of events that occur before an interrupt is generated based on whether or not a given number of events occur within a pre-determined time period.

19. The interrupt controller of claim 15 wherein said controller is part of a network controller.

\* \* \* \* \*